United States Patent
Pinder et al.

(10) Patent No.: US 9,843,451 B2
(45) Date of Patent: Dec. 12, 2017

(54) APPARATUS AND METHOD FOR MULTI-STATE CODE SIGNING

(71) Applicant: MOTOROLA SOLUTIONS, INC, Schaumburg, IL (US)

(72) Inventors: Ellis A. Pinder, Davie, FL (US); Thomas S. Messerges, Schaumburg, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 459 days.

(21) Appl. No.: 14/528,524

(22) Filed: Oct. 30, 2014

(65) Prior Publication Data

US 2016/0127133 A1    May 5, 2016

(51) Int. Cl.
| | |
|---|---|
| H04L 29/06 | (2006.01) |
| H04L 9/32 | (2006.01) |
| G06F 21/51 | (2013.01) |
| G06F 21/12 | (2013.01) |

(52) U.S. Cl.
CPC .......... *H04L 9/3268* (2013.01); *G06F 21/121* (2013.01); *G06F 21/51* (2013.01); *H04L 9/3247* (2013.01); *H04L 63/08* (2013.01); *H04L 63/0823* (2013.01); *H04L 63/126* (2013.01); *G06F 2221/0704* (2013.01)

(58) Field of Classification Search
CPC ..... H04L 9/3268; H04L 9/3247; H04L 63/08; H04L 63/0823; H04L 63/126; G06F 21/51
See application file for complete search history.

(56) References Cited

U.S. PATENT DOCUMENTS

| | | | |
|---|---|---|---|
| 5,958,051 A | 9/1999 | Renaud et al. | |
| 6,154,844 A * | 11/2000 | Touboul | G06F 21/51 713/164 |
| 7,849,315 B2 | 12/2010 | Hardy et al. | |
| 8,095,799 B2 | 1/2012 | Hauck et al. | |
| 8,364,567 B2 * | 1/2013 | Shnowske | G06Q 40/00 705/35 |
| 8,489,868 B2 | 7/2013 | Yach et al. | |
| 8,572,368 B1 | 10/2013 | Deacon | |
| 8,769,304 B2 * | 7/2014 | Kirsch | G06Q 20/0855 380/30 |
| 8,954,732 B1 * | 2/2015 | Watsen | H04L 9/3263 713/157 |
| 9,032,204 B2 * | 5/2015 | Byrd | H04L 9/3268 705/42 |
| 9,112,854 B1 * | 8/2015 | Bhimanaik | H04L 63/0823 |

(Continued)

*Primary Examiner* — Techane Gergiso

(57) ABSTRACT

An electronic device includes a memory configured to store a lab certificate, a code authentication certificate and the executable code. The electronic device also includes a processor associated with a unique device identifier. For a first operational condition of the plurality of operational conditions, the processor is configured to: retrieve the code authentication certificate associated with the executable code; determine that a valid lab certificate is present in the memory; authenticate the code authentication certificate by determining that the code authentication certificate is signed with a private developer key and that the signature is valid; and execute the executable code on the electronic device responsive to determining that the lab certificate is valid and authenticating the code authentication certificate.

21 Claims, 6 Drawing Sheets

(56) References Cited

U.S. PATENT DOCUMENTS

| | | |
|---|---|---|
| 2002/0078380 A1 | 6/2002 | Lin et al. |
| 2003/0163685 A1 | 8/2003 | De Atley et al. |
| 2004/0025022 A1* | 2/2004 | Yach ................... G06F 21/121 713/176 |
| 2005/0060549 A1* | 3/2005 | England ................. G06F 21/10 713/175 |
| 2009/0031409 A1* | 1/2009 | Murray ............... H04N 21/462 726/10 |
| 2009/0126028 A1* | 5/2009 | Traenkenschuh ..... G06F 21/572 726/30 |
| 2009/0228704 A1* | 9/2009 | de Atley .................. G06F 8/20 713/156 |
| 2009/0249075 A1 | 10/2009 | De Atley et al. |
| 2009/0257595 A1 | 10/2009 | de Cesare et al. |
| 2011/0087870 A1 | 4/2011 | Spangler et al. |
| 2011/0191860 A1* | 8/2011 | Karlsen .................. G06F 21/12 726/27 |
| 2012/0179907 A1* | 7/2012 | Byrd .................... H04L 9/3268 713/156 |
| 2013/0073597 A1* | 3/2013 | Haff ....................... H04L 29/06 707/828 |
| 2013/0145456 A1* | 6/2013 | Kiehtreiber ............ G06F 21/51 726/17 |
| 2014/0150096 A1* | 5/2014 | Moon .................... G06F 21/645 726/22 |
| 2014/0245417 A1* | 8/2014 | Hu ...................... H04L 63/0807 726/7 |

* cited by examiner

APPARATUS AND METHOD FOR MULTI-STATE CODE SIGNING

BACKGROUND OF THE INVENTION

Software to be executed on an electronic device may be digitally signed to confirm the origin/author of the software, guarantee the integrity of the software (for example, guarantee that the software has not be altered or corrupted), and/or ensure that the software is approved for execution on the electronic device. Many code signing implementations allow the software to be digitally signed with a private key and verified with a corresponding public key. A developer or entity releasing software may use a unique private key assigned to the developer or entity to digitally sign the software after it is created. Before the software can be executed on an electronic device, the electronic device attempts to verify the signature using the public key corresponding to the unique private key, the public key (or some representation of the public key, such as the cryptographic hash of the public key) being embedded into the electronic device, such that it becomes an unalterable, trust anchor. If the electronic device can verify the digital signature, the device may execute the software. If, on the other hand, the electronic device cannot verify the signature, the device may not execute the software. This code signing implementation therefore enhances software security and prevents the electronic device from being hacked (broken) into and loaded with unauthorized software without this unauthorized software being detected the next time the device checks the signature of this software.

While security may be enhanced by such a code signing implementation, in a development environment, software developers may need to load and execute newly created software on one or more devices. To ensure that software created in the development environment can be executed on one or more devices, all developers in this environment may be allowed to digitally sign software such that, once signed, this software can be executed on a set of devices. However, this approach may weaken the software security. Consider for example that when each developer in a group is allowed to digitally sign and operate software on the set of devices, any of the developers may maliciously sign the software, leaving the set of devices vulnerable to execute unauthorized code.

As an alternative, a select group (referred to herein as a release authority) may be authorized to digitally sign software with a private release key, wherein software signed with the private release key may be executed on the set of devices. Rather than providing each developer with access to the private release key, each developer may be provided access to a private developer key, wherein software signed with the private developer key may be executed on only one device. Each developer's digital signature will be over the software and may also be over a device identifier associated with an electronic device on which the software is to be executed. This restricts execution of the developer-signed software to one electronic device. Accordingly, before the developer-signed software can be executed on a device, an authentication routine on the device ensures that the device identifier in the digital signature matches a unique device identifier associated with the device.

This code signing implementation may be inconvenient in the development phase. Consider an example where software being developed must be tested on multiple devices, wherein a first developer builds the software and sends it to a second developer to be tested. In order to test the software on more than one device, the first developer must obtain the unique device identifier associated with each device on which the software is to be tested, must include the unique device identifier for each device when calculating the digital signature using the developer private key, and send the signed software for each device to the second developer. The process of individually signing the software for each device may be time-consuming and inconvenient for the first developer. In addition, the second developer must ensure that the appropriate software is installed on each device, i.e., the second developer must ensure that the developer-signed software with the unique device identifier for the first device is installed on the first device; the developer-signed software with the unique device identifier for the second device is installed on the second device; and so on. If the second developer does not appropriately match the developer-signed software with the appropriate device, the software will not be executed on the device because the device identifier in the developer-signed software will not match the unique device identifier associated with the device. In addition to being error-prone, the process of individually matching the developer-signed software to the appropriate device and installing the correctly-signed software on each device may also be time-consuming and inconvenient for the second developer.

Accordingly, there is a need for a method and apparatus for enabling multi-state code signing without compromising security.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
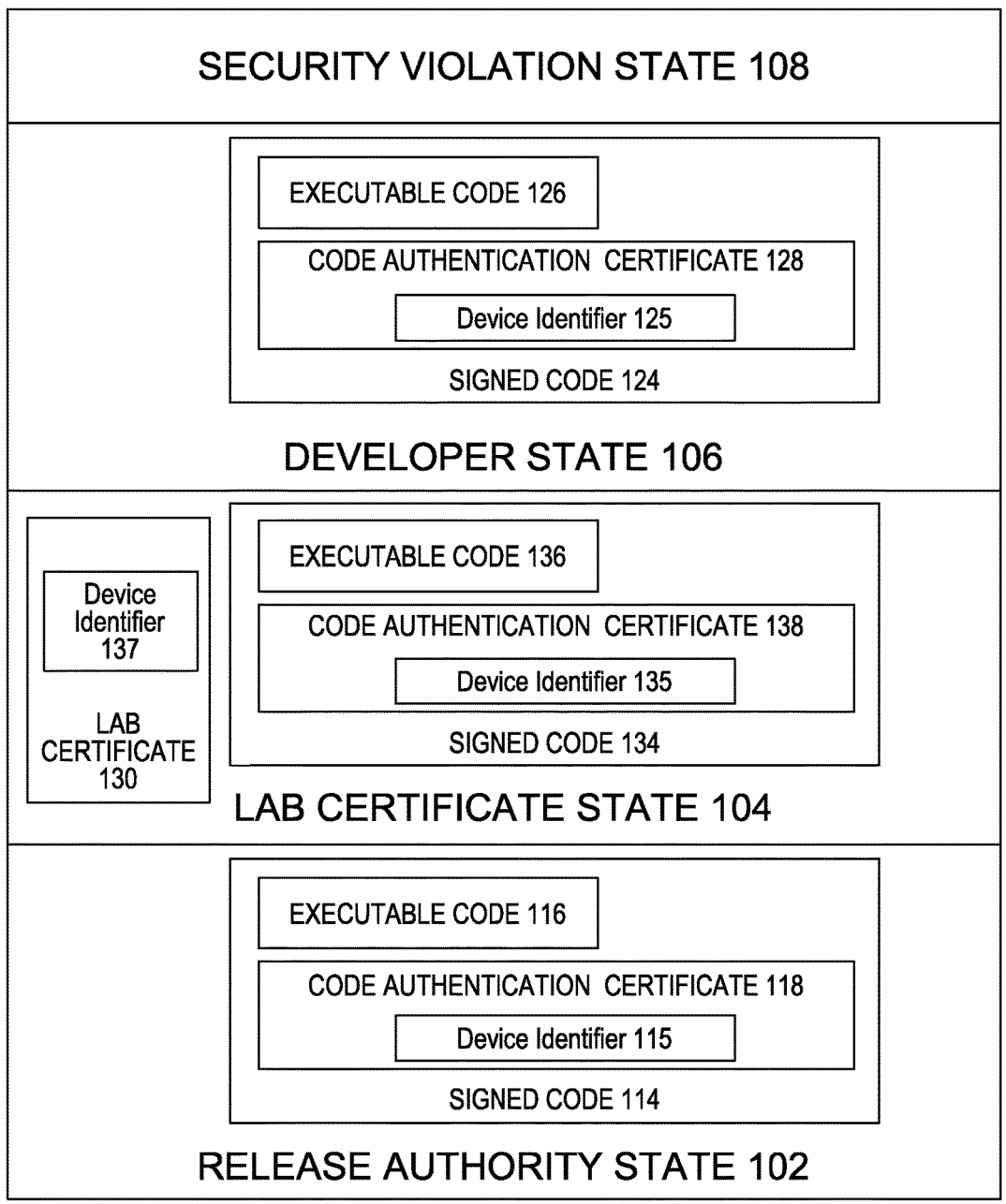
FIG. 1A is a block diagram showing four operational states of a multi-state code signing system and the associated configurations, carried out in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and methods for executing executable code on an electronic device. The electronic device includes a memory configured to store a lab certificate, a code authentication certificate and the executable code. The electronic device also includes a processor associated with a unique device identifier. For a first operational condition of the plurality of operational conditions, the processor is configured to: retrieve the code authentication certificate associated with the executable code; determine that a valid lab certificate is present in the memory; authenticate the code authentication certificate by determining that the code authentication certificate is signed with a developer key and that the signature is valid; and execute the executable code on the electronic device responsive to determining that the lab certificate is valid and authenticating the code authentication certificate.

FIG. 1A is a block diagram showing four operational states (conditions) of a multi-state code signing implementation and their associated configurations, carried out in accordance with some embodiments. The multi-state code signing implementation includes a release authority state 102, a lab certificate state 104, a developer state 106, and a security violation state 108. One of the states in the multi-state code signing may be active on an electronic device (shown, for example, as device 150 in FIG. 1B) at any given time. Software to be executed on electronic device 150 may be digitally signed at each of release authority state 102, lab certificate state 104 and developer state 106. At security violation state 108, software execution is substantially restricted.

Figure 1B:
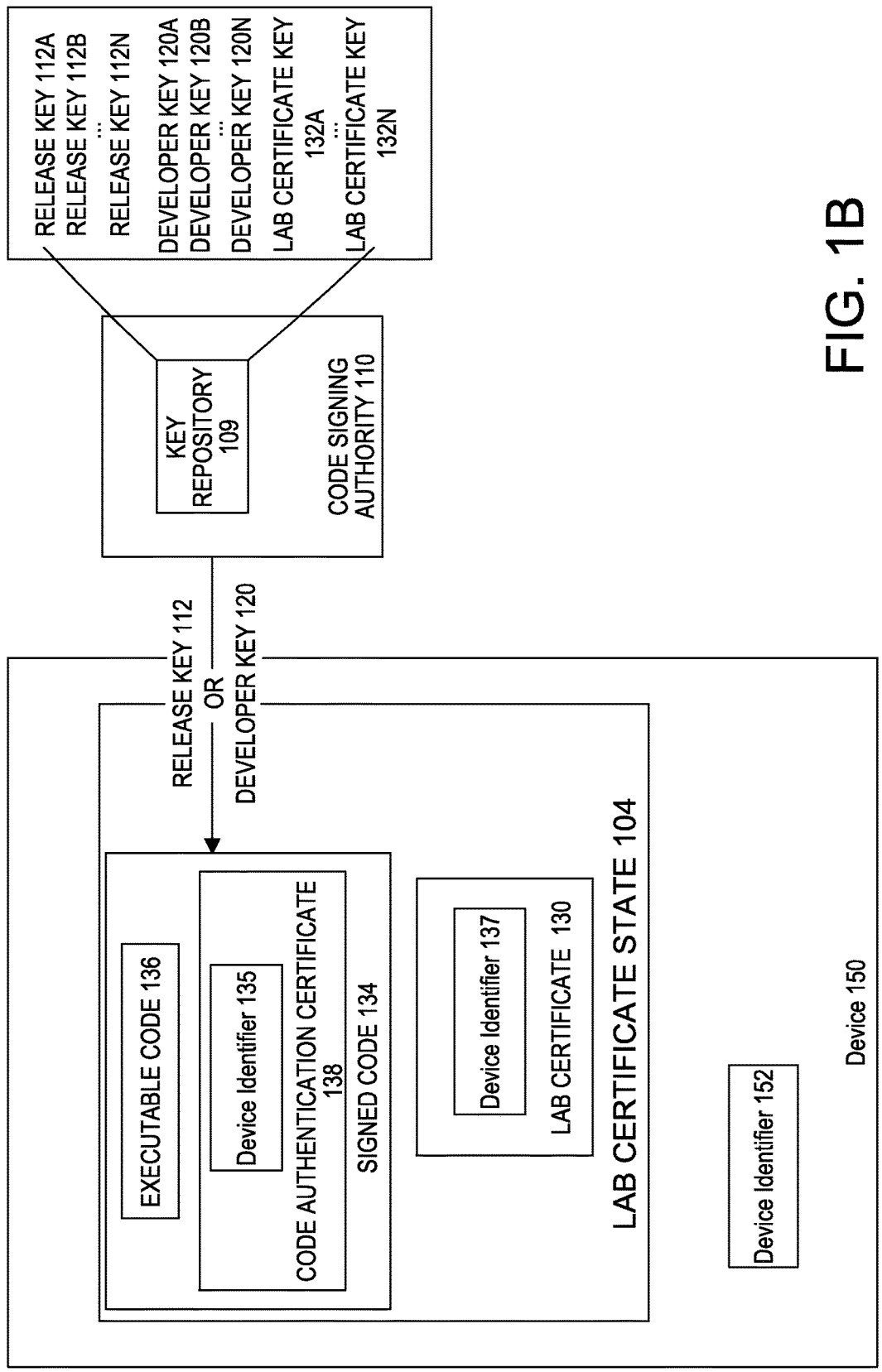
FIG. 1B is a block diagram of a structure for implementing the multi-state code signing in accordance with some embodiments.

FIG. 1B is a block diagram of a structure for implementing the multi-state code signing in accordance with some embodiments. Each electronic device (such as, device 150) that is configured to execute the digitally signed software includes a unique, non-secret device/hardware identifier 152. Public and private key pairs from a key repository 109 may be provided by a code signing authority 110 for use by an electronic device when in release authority state 102, lab certificate state 104, or developer state 106 (although only lab certificate state 104 is shown on device 150 in FIG. 1B to illustrate that lab certificate state 104 is active at a given point in time). In addition, although only one key repository 109 is shown for ease of illustration, it should be noted that more than one key repository may be used by code signing authority 110.

When software is signed with a key from key repository 109, the signed code is configured to include an executable code portion and a code authentication certificate, wherein the code authentication certificate may be signed with a key from key repository 109. For example, device 150 executing the executable code portion may authenticate a key used to sign an associated code authentication certificate by confirming that a public key associated with a private key can be chained back to a hardware root of trust. For example, the public key may either be hardcoded into a hardware portion (e.g., the key or its hash) of device 150 or the public key may be signed with a key associated with a public key that is hardcoded into the hardware (also referred to herein as a chain of trust). If device 150 cannot authenticate the key used to sign the associated code authentication certificate or if the key is found to be invalid for any reason, device 150 may move to security violation state 108, wherein at this state, device 150 determines that there is a security violation and ends the signing authentication. Typically, violation state 108 disallows the further loading or execution of software because such software is determined to be untrusted.

Consider FIG. 1A with FIG. 1B and take into account at a given point in time device 150 may be operating at any of states 102-108, even though only state 104 is shown in FIG. 1B. To operate device 150 at release authority state 102, a selected group (referred to herein as the release authority) may use code signing authority 110 to access public-key infrastructure (PKI) center services to provide access to private keys 112 (referred to herein as release keys $112a$-$112n$). When software is being built, the release authority may use code signing authority 110 to digitally sign the software with one of private release keys $112a$-$112n$. Signed code 114 at this state may therefore include executable code 116 and code authentication certificate 118 that is signed with one of private release keys $112a$-$112n$. Code authentication certificate 118 may include a device identifier 115. Signed coded 114 may subsequently be installed and executable code 116 may be executed on any device in a group if a device (such as, device 150) in the group can verify the signature associated with code authentication certificate 118 using a release authority public key rooted by a trust anchor of the device.

To operate device 150 at developer state 106, code signing authority 110 may also use PKI center services to provide access to a private key 120 (i.e., one of developer keys $120a$-$120n$) to each developer, such that each developer may digitally sign software with one of developer keys $120a$-$120n$. In an embodiment, a set of developers may share a single developer key managed by the code signing authority 110. Signed code 124 at this state is configured to include executable code 126 and code authentication certificate 128 signed with one of developer keys $120a$-$120n$. Code authentication certificate 128 is configured to include a device identifier 125 such that associated executable code 126 may be executed on a device (for example, device 150) whose unique device identifier 152 matches device identifier 125 in code authentication certificate 128. Accordingly, executable code 126 may be executed on device 150 if device identifier 152 matches device identifier 125 in code authentication certificate 128 and if device 150 can verify the digital signature associated with code authentication certificate 128 using a developer public key rooted by a trust anchor of device 150. In this operational state, even if a developer maliciously signs the software, signed code 124 would be executed only on a device whose unique device identifier matches device identifier 125 in code authentication certificate 128 and whose digital signature can be authenticated by the device. Typically, the unique device identifier 152 is a unique identifier immutably fused into the processor by the processor manufacturer. Accordingly, code executing at developer state 106 could execute on at most one instance of device 150.

To operate device 150 at lab certificate operational state 104, a lab certificate 130 may be configured to include attributes that comply with a given policy. Lab certificate 130 may also be configured to include a device identifier 137 such that lab certificate 130 may be bound to a device (for example, device 150) whose unique device identifier (i.e., device identifier 152) matches device identifier 137 in lab certificate 130. Each lab certificate 130 may be created in a privileged operation by a predefined group (referred to herein as a lab certificate creation group). The lab certificate creation group may also access code signing authority 110 services, wherein each lab certificate 130 created by the lab certificate creation group may be signed with a private key 132 associated with the lab certificate creation group. In an embodiment, lab certificate 130 may not include executable code; however, code signing authority 110 may still be used to provide signing services for lab certificate 130.

Lab certificate 130 may be installed or removed from device 150 as needed, and this may be done independent from programming or maintenance of signed code 134. Upon power-up, device 150 validates lab certificate 130 by verifying that the associated lab certificate signature is valid, using a lab certificate public key 132 rooted by a trust anchor of device 150, and by verifying that device 150 unique identifier 152 matches device identifier 137 in lab certificate 130. When a valid lab certificate 130 is installed on device 150, device 150 becomes a lab device. On the other hand, if device 150 cannot verify the validity of lab certificate 130 by verifying that the associated lab certificate signature is valid or cannot verify that its unique identifier 152 matches device identifier 137 in lab certificate 130, then lab certificate 130 may be marked as invalid. Accordingly, each lab certificate 130 may be marked as valid on at most one device, i.e., the device where the unique device identifier 152 for the device matches the device identifier 137 in the lab certificate.

To operate device 150 at lab certificate state 104, code authentication certificate 138 may be digitally signed with either one of private release keys 112a-112n or one of developer keys 120a-120n. If code authentication certificate 138 is signed with one of private release keys 112a-112n, the presence of a valid lab certificate on device 150 becomes irrelevant and executable code 136 may be executed on device 150 once device 150 can verify the signature associated with code authentication certificate 138 using a release authority public key rooted by a trust anchor of the device.

If code authentication certificate 138 is signed with one of developer keys 120a-120n, then executable code 136 may be thereafter be executed on any device that includes a valid lab certificate 130, if the developer public key is rooted by a trust anchor of the device. It should be noted that signed code 134 may be executed on any device with a valid lab certificate 130, even if the device identifier 135 in code authentication certificate 138 does not match the unique device identifier 152 for the device. This allows developers to easily share/exchange software built for legitimate development reasons among devices that are designated as lab devices. Embodiments therefore limit the inconvenience of having a developer individually sign software to be executed on each lab device and still limit the ability of the developer to introduce signed code 134 to a large number of devices outside of the development environment.

Lab certificate 130 may be configured to be installed on and/or removed from a device, independent of other software operations or installations on the device. Lab certificate 130 may be coincident with development or debug certificates used to facilitate development/debugging activities. For example, some processors may support a special certificate that can be used to enable debugging (referred to herein as a debugging certificate). Such a debugging certificate may be implemented as lab certificate 130 if the debugging certificate includes a device identifier (for example, device identifier 137). In an embodiment, a lab certificate may be a signature over just the unique device identifier (for example, device identifier 152) or cryptographic hash of the unique device identifier 152.

Lab certificate 130 may be configured to include an expiration mechanism. For example, when lab certificate 130 is created, it may include one or more of a time-based expiration value or a counter value. In the case where lab certificate 130 includes a time-based expiration value, when the time associated with a time-based expiration value has passed, the lab certificate may expire. In the case where lab certificate 130 includes a counter value, each time an event occurs, a counter on the device may be incremented. For example, each time the device is booted up, a counter on the device may be incremented. When the counter on the device increases beyond the counter value in lab certificate 130, the lab certificate 130 may expire.

A processor on the device with lab certificate 130 may execute instructions associated with the multi-state code signing out of a secure memory area on the device or a protected processor area. A boot process of a device typically may involve multiple states, each of which may be configured to authenticate the next state before control is passed to that state. For example, when is device is reset, instructions in a read-only memory may be used to authenticate a second level boot-loader which further authenticates a third level boot-loader, wherein the third level boot-loader may authenticate a high-state operating system. The lab certificate verification instructions may be executed in one of the second or third level boot-loader and the validation results may be made accessible to higher level software layers via, for example, an application programming interface (API) to software running in a trusted execution environment. In some embodiments, operations in the lab certificate verification process may be performed once and the validation results may be stored securely and made accessible, via the API to software running in a trusted execution environment, during subsequent access to the lab certificate. In an embodiment, a code authentication certificate (for example, code authentication certificate 118, 128, or 138) may include the hash of the executable code (for example executable code 116, 126, 136, respectively) and may, in the case of developer operational state 106, include the unique device ID. In an alternate embodiment, signing executable code (for example, executable code 116, 126, 136), and optionally, the unique device ID, directly without using a certificate and just including the signature as part of the signed code object (for example, signed code 114, 124, 134) is also possible.

Figure 2:
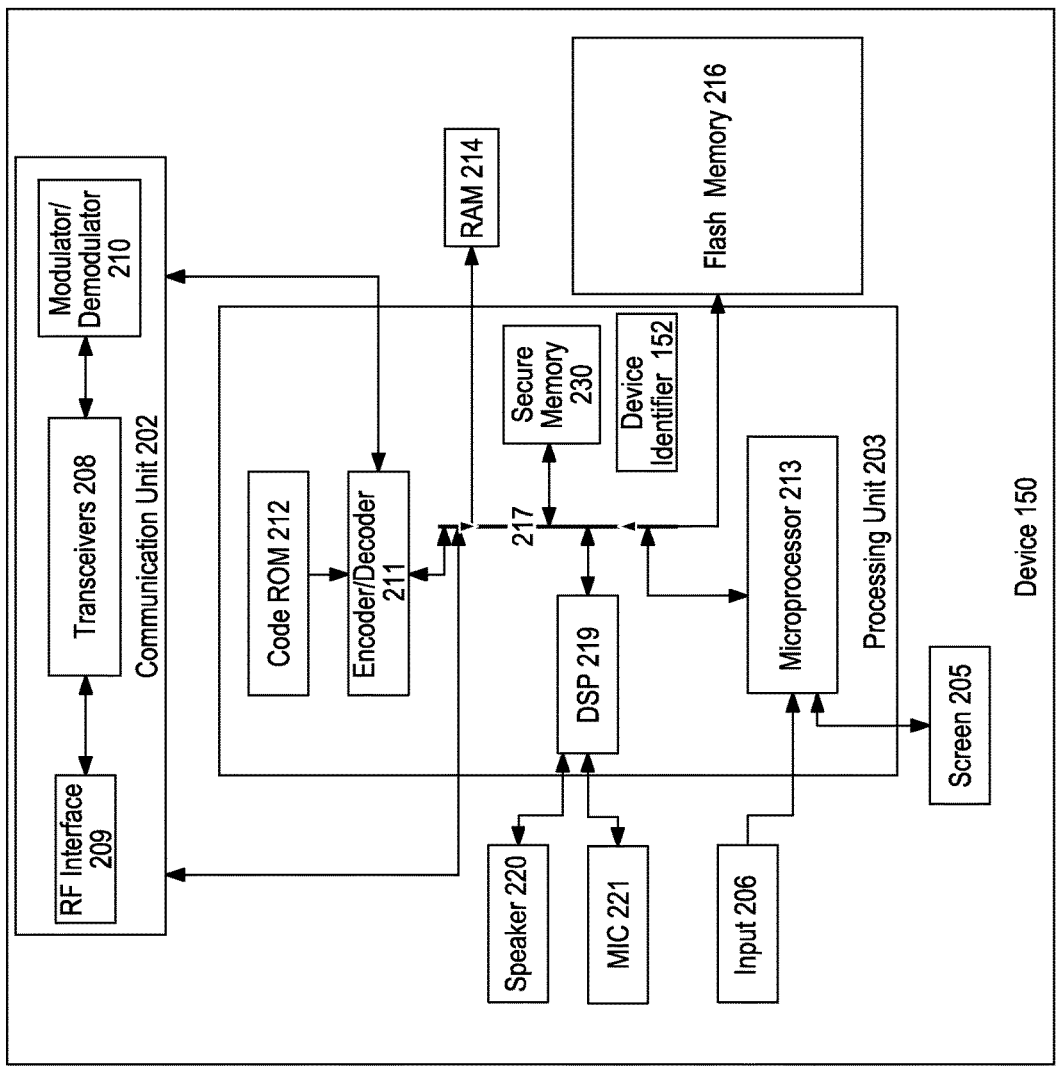
FIG. 2 is a block diagram of a device used in accordance with some embodiments.

FIG. 2 is a block diagram of the device 150 in accordance with some embodiments. Device 150 may include a communications unit 202 coupled to a common data and address bus 217 of a processor 203. Device 150 may also include an input unit (e.g., keypad, pointing device, etc.) 206, an output transducer unit (e.g., speaker) 220, an input transducer unit (e.g., a microphone) (MIC) 221, and a display screen 205, each coupled to be in communication with the processor 203.

The processor 203 may include the unique hardware identifier 152 that is maintained in one or more memory devices of the device 150, for example, an IMEI (International Mobile Equipment Identity) or any other identifier of electronic device hardware that may be hard coded into a device, for example, into a same integrated circuit as includes processor 203. The processor 203 may further include one or more of a microprocessor 213 and digital signal processor (DSP) 219 coupled, by the common data and address bus 217, to the encoder/decoder 211 and to the one or more memory devices, such as a read-only memory (ROM) 212, a random access memory (RAM) 214, and a flash memory 216. One or more of ROM 212, RAM 214, and flash memory 216 may be included as part of processor 203 or may be separate from, and coupled to, the processor. Encoder/decoder 211 may be implemented by microprocessor 213 or DSP 219, or may be implemented by a separate component of the processor 203 and coupled to other components of the processor 203 via bus 217. The one or more memory devices further include a secure RAM 230 that may be used to store sensitive data and sensitive code that may be executed by the device. For example, the code which authenticates the lab certificate and its validation result may be stored in secure RAM 230. Techniques to control access to secure RAM 230 are well-known in the art.

Communications unit 202 may include an RF interface 209 configurable to communicate with network components, and other user equipment within its communication range. Communications unit 202 may include one or more broadband and/or narrowband transceivers 208, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 202 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 210 that is coupled to the encoder/decoder 211.

Figure 3:
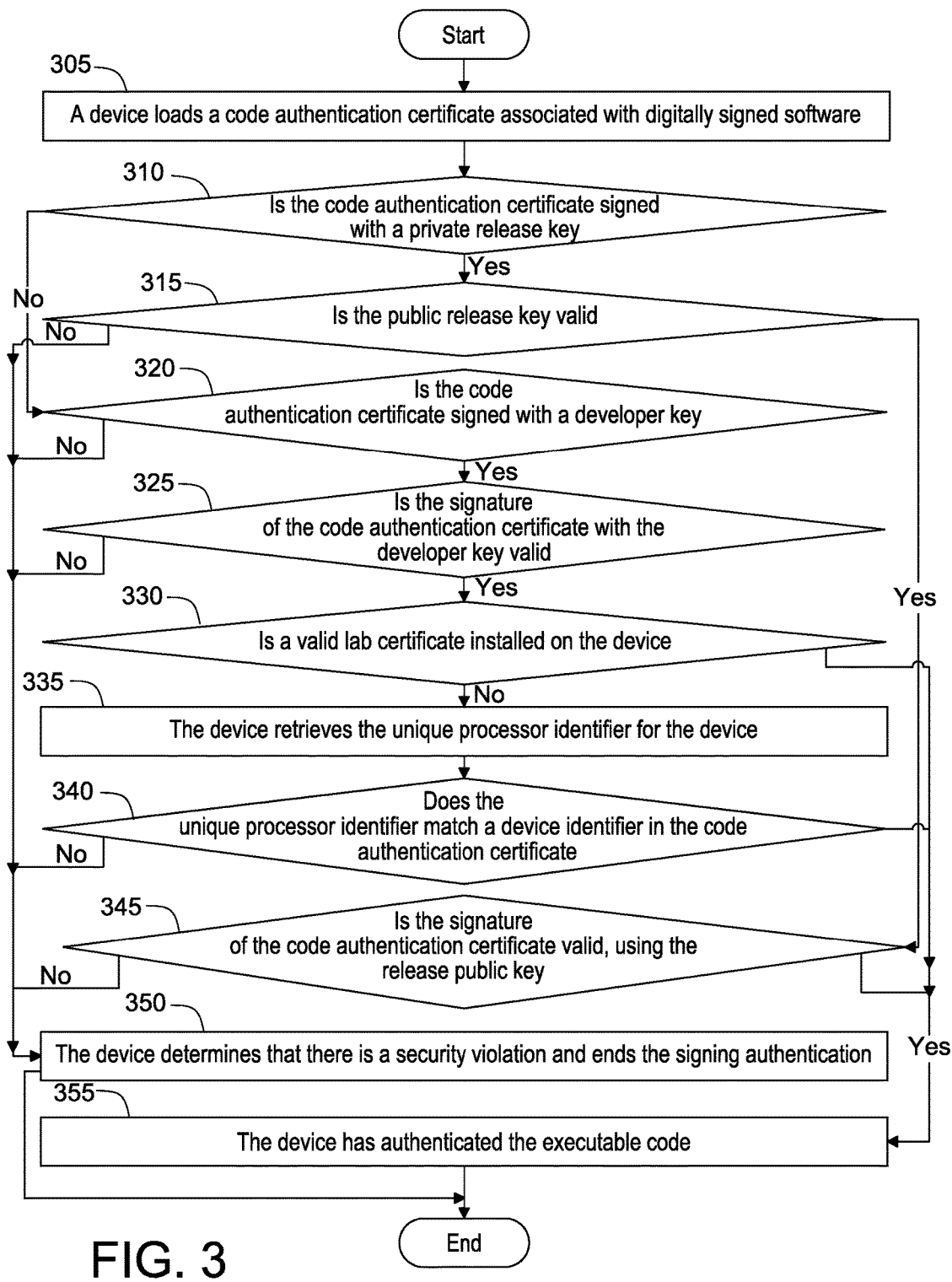
FIG. 3 is a flow diagram of a multi-state code signing authentication implemented in accordance with some embodiments.
Figure 4:
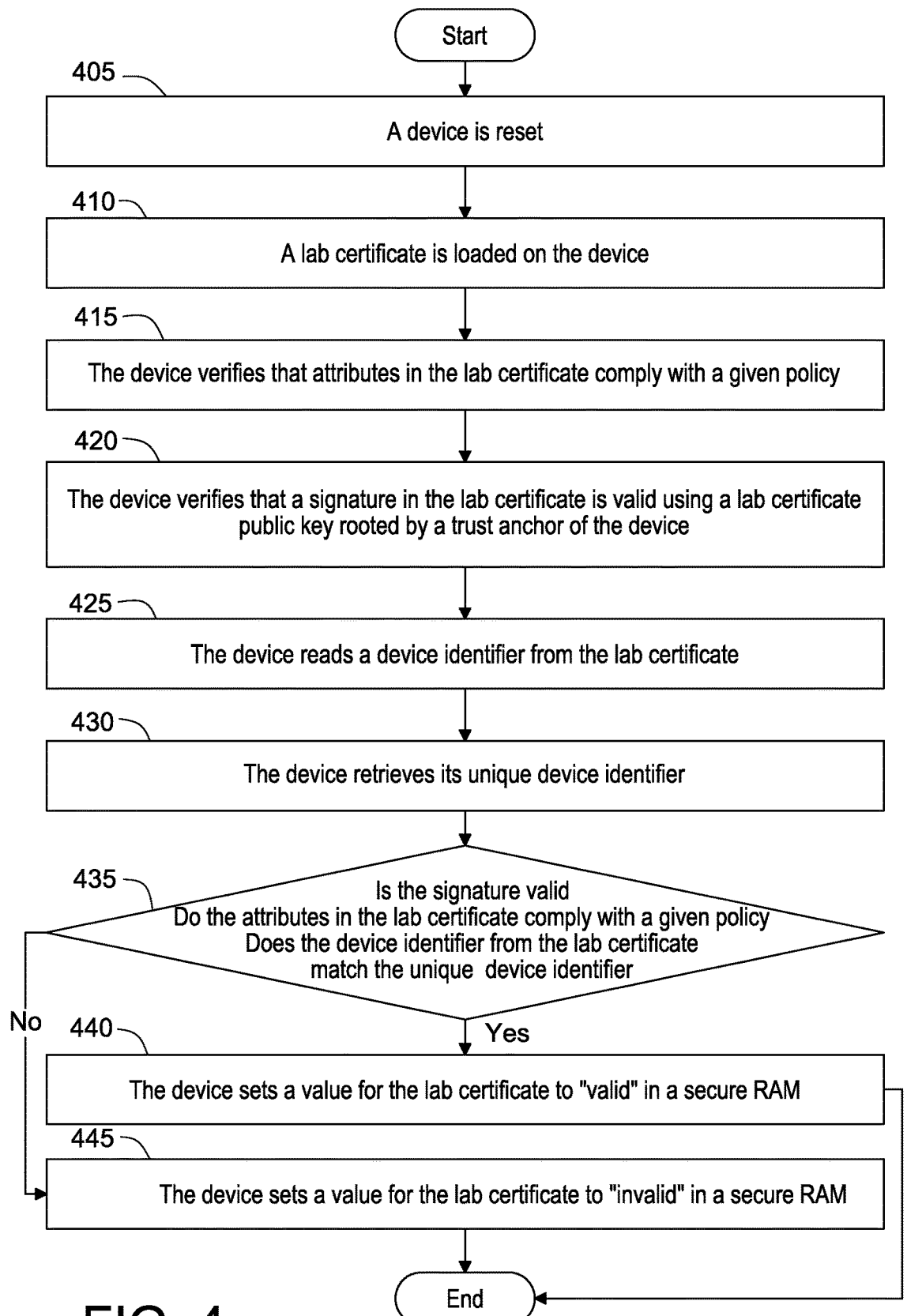
FIG. 4 is a flow diagram of a lab certificate authentication implemented in accordance with some embodiments.
Figure 5:
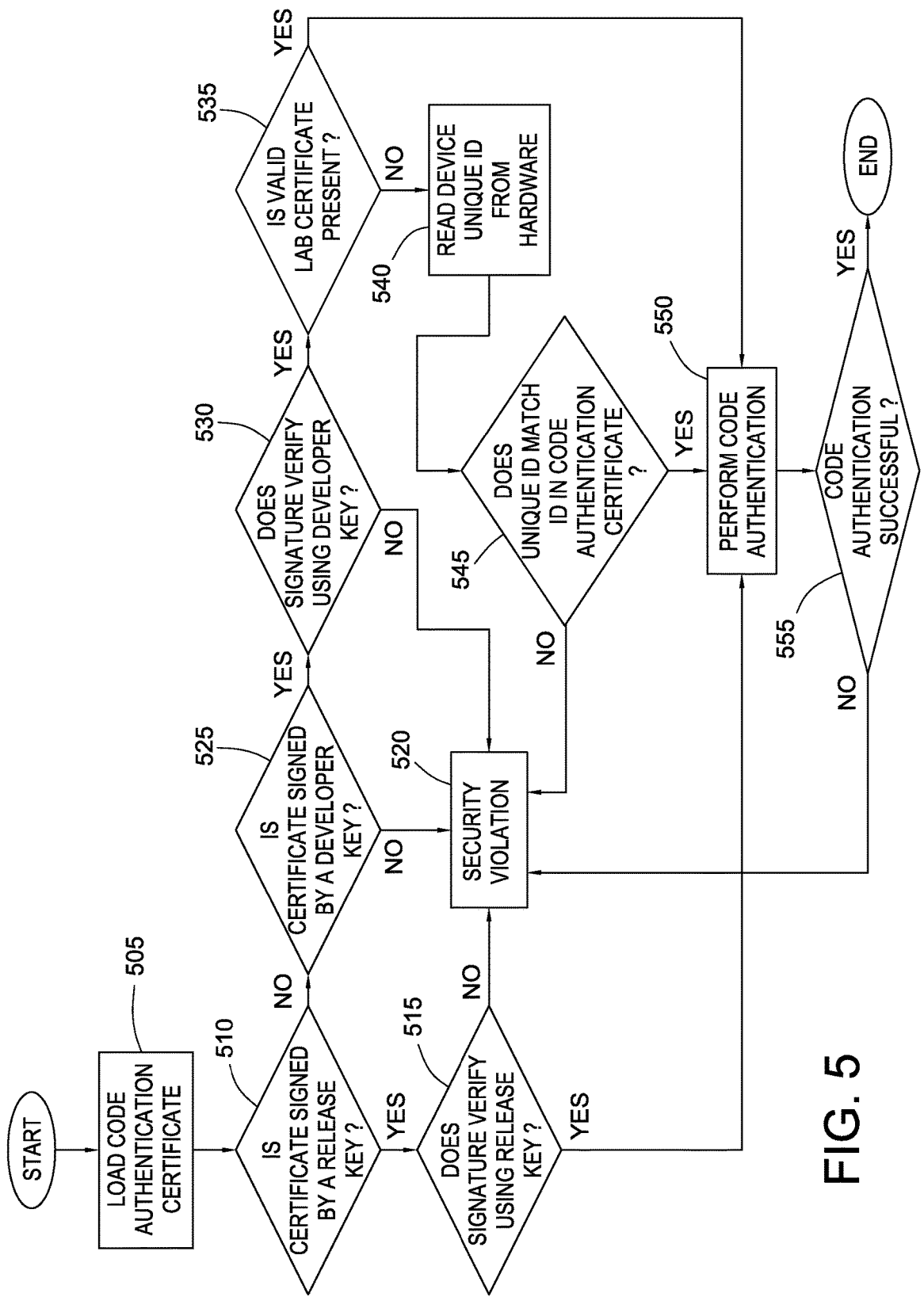
FIG. 5 is a flow diagram of a multi-state code signing authentication implemented in accordance with some embodiments.

The one or more memory devices 212, 214, 216, 230 further store code for decoding or encoding data such as control, request, or instruction messages, channel change messages, and/or data or voice messages that may be transmitted or received by device 150, and store other programs and instructions that, when executed by the processor 203, provide for the device 150 to perform the functions and operations described herein as being performed by the device, such as one or more of the steps set forth in FIGS. 3, 4, and 5.

Referring now to FIG. 3, a flow diagram is provided that illustrates a multi-state code signing authentication performed by device 150 in accordance with some embodiments. At 305, the device loads a code authentication certificate associated with digitally signed software. At 310, the device determines if the code authentication certificate is signed with a private release key. At 315, if the code authentication certificate is signed with a private release key, the device determines if the public release key is valid. If the public release key is valid (e.g., it is rooted by a trust anchor of the device), at 345, the device verifies the validity of the signature of the code authentication certificate using the public release key. If, at 345, the signature of the code authentication certificate using the release public key is determined to be valid, then at 355 the device has authenticated the executable code. If, at 345, the signature of the code authentication certificate is determined to not be valid, then at 350, the device determines that there is a security violation and ends the signing authentication. At 315, if the code authentication certificate is not signed with a private release key, then at 320, device determines if the code authentication certificate is signed with a developer key. If, at 320, the code authentication certificate is not signed with a developer key, at 350, the device determines that there is a security violation and ends the signing authentication. At 325, if the code authentication certificate is signed with a developer key, the device verifies the signature of the code authentication certificate with the developer key. If the signature is not valid, at 350, the device determines that there is a security violation and ends the signing authentication. At 330, if the signature is determined to be valid, the device determines if a valid lab certificate is installed on the device. If, at 330, a valid lab certificate is determined to be installed on the device, at 355, the device has authenticated the executable code. At 335, if a valid lab certificate is not installed on the device, the device retrieves the unique device identifier for the device. At 340, the device determines if the unique device identifier matches a device identifier in the code authentication certificate. If, at 340, the unique device identifier matches a device identifier in the code authentication certificate, at 355, the device has authenticated the executable code. If, at 340, the unique device identifier does not match a device identifier in the code authentication certificate, at 350, the device determines that there is a security violation and ends the signing authentication.

Referring now to FIG. 4, a flow diagram is provided that illustrates a lab certificate authentication by device 150 in accordance with some embodiments. At 405, the device is reset. At 410, a lab certificate is loaded on the device. At 415, the device verifies that attributes in the lab certificate comply with a given policy. At 420, the device verifies that a signature in the lab certificate is valid using a lab certificate public key rooted by a trust anchor of the device. At 425, the device reads a device identifier from the lab certificate. At 430, the device retrieves its unique device identifier. At 435, the device determines if the signature is valid, if the attributes in the lab certificate comply with a given policy, and if the device identifier from the lab certificate matches its unique device identifier. At 440, if all of the conditions from 435 are true, the device sets a value for the lab certificate to "valid" in secure RAM 230. At 445, if any one of the conditions from 435 are not true, the device sets a value for the lab certificate to "invalid" in the secure RAM.

Referring now to FIG. 5, a flow diagram is provided that illustrates a multi-state code signing authentication performed by device 150 in accordance with other embodiments. At 505, a code authentication certificate associated with a code is loaded on the device. At 510 and 525, the device identifies a key used to sign the certificate and that can be used to verify the code authentication certificate. The device further determines whether the identified key is a private release key or a developer key. If, at 510, the device determines that the key used to sign the code authentication certificate is a private release key, then at 515 the device authenticates the code authentication certificate using the public release key, that is, verifies a signature of the certificate using the public release key. If the device is able to verify the signature using the public release key then, at 550, the device authenticates the executable code. However, if the device determines that the key used to sign the code authentication certificate is a private release key but the device cannot verify the signature using the public release key then, at 520, the device determines that there is a security violation and ends the signing authentication.

If, at 525, the device determines that the key used to sign the code authentication certificate is a private developer key then, at 530, the device authenticates the code authentication certificate using the public developer key, that is, verifies a signature of the certificate using the public developer key. If the device determines that the key used to sign the code authentication certificate is a private developer key but the device cannot verify the signature using the public developer key then the flow diagram proceeds to 520 and the device determines that there is a security violation and ends the signing authentication.

If, at 530, the device is able to verify the signature using the public developer key then, at 535, the device determines whether a valid lab certificate is present on the device. If a valid lab certificate is present on the device, then the flow diagram proceeds to 550 and the device authenticates the executable code. However, if, at 535, the device determines that a valid lab certificate is not present on the device, then at 540 the device reads the hardware identifier 152 maintained by the device. At 545, the device determines whether the code authentication certificate includes a device identifier and, if so, compares the device identifier included in the code authentication certificate to the hardware identifier 152 maintained by the device.

If, at 545, the device identifier included in the code authentication certificate does not match the hardware identifier maintained by the device, then the flow diagram proceeds to 520 and the device determines that there is a security violation and ends the signing authentication. However, if, at 545, the device identifier included in the code authentication certificate matches the hardware identifier maintained by the device, then the flow diagram proceeds to 550 and the device performs an authentication of the executable code. If the authentication is successful (555) then the flow diagram ends. If the authentication is unsuccessful (an authentication failure) (555), then the flow diagram proceeds to 520 and the device determines that there is a security violation and ends the signing authentication.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic device, comprising:
   a memory configured to store a lab certificate, a code authentication certificate, a key rooted by a trust anchor, and an executable code; and a processor associated with a unique device identifier, wherein the processor is configured to:
retrieve the code authentication certificate associated with the executable code;
determine that the code authentication certificate is valid by verifying a signature of the code authentication certificate using the key;
determine whether the key is a public release key or a public developer key rooted by a trust anchor of the electronic device;
execute the executable code on the electronic device responsive to determining the key is a public release key and that the signature is valid;
responsive to determining that the key is a public developer key, determine that a valid lab certificate is present in the memory; and
execute the executable code on the electronic device responsive to determining that the key is a public developer key, that the signature is valid, and that the lab certificate is valid.

2. The electronic device of claim 1, wherein the processor is further configured to:
determine whether the code authentication certificate comprises a device identifier and whether the device identifier matches the unique device identifier responsive to determining the key is a public developer key; and
execute the executable code on the electronic device responsive to determining the key is a public developer key, that the signature is valid, the code authentication certificate comprises a device identifier, and that the device identifier matches the unique device identifier.

3. The electronic device of claim 1, wherein the processor is further configured to authenticate the code authentication certificate by further determining that the public developer key is rooted by a trust anchor of the electronic device.

4. The electronic device of claim 1, wherein the lab certificate is valid when the processor authenticates the lab certificate using a public key rooted by a trust anchor of the electronic device to verify a digital signature of the lab certificate, and verifies that a device identifier in the lab certificate matches the unique device identifier.

5. The electronic device of claim 1, wherein the processor is configured to at least one of:
install the lab certificate on the electronic device independent of other software operations on the electronic device; and
remove the lab certificate from the electronic device independent of other software operations on the electronic device.

6. The electronic device of claim 1, wherein the lab certificate is at least one of a development certificate and a debugging certificate used to enable at least one of a development activity and a debugging activity executed on the electronic device, wherein the at least one development certificate and debugging certificate includes a device identifier.

7. The electronic device of claim 1, wherein the lab certificate comprises an expiration value and wherein determining that the valid lab certificate is present comprises determining based on the expiration value of the lab certificate that the lab certificate has not expired.

8. The electronic device of claim 7, wherein the expiration value is one of a time stamp and a first counter value and wherein determining that the lab certificate has not expired comprises one of:

determining, by the processor, a time value and comparing the time stamp to the time value; and
determining, by the processor, a second counter value and comparing the first counter value to the second counter value.

9. The electronic device of claim 1, wherein the processor is configured to execute the instructions associated with the plurality of signing states from a secure memory area.

10. The electronic device of claim 1, wherein the processor is configured to execute the lab certificate authentication and store authentication results for subsequent lab certificate verification.

11. A method for an electronic device to execute code, the method comprising:
maintaining, by the electronic device, a unique device identifier and a key rooted by a trust anchor;
retrieving, by the electronic device, a code authentication certificate associated with an executable code to be executed on the electronic device;
determining that the code authentication certificate is valid by verifying a signature of the code authentication certificate using the key;
determining whether the key is a public release key or a public developer key rooted by a trust anchor of the electronic device;
executing the executable code on the electronic device responsive to determining the key is a public release key and that the signature is valid;
responsive to determining that the key is a public developer key, determining, by the electronic device, whether a lab certificate is present in the electronic device;
in response to determining that a lab certificate is present, executing, by the electronic device, the executable code on the electronic device responsive to determining that the lab certificate is valid and that the code authentication certificate is signed with a private developer key and that the signature is valid.

12. The method of claim 11, wherein the method further comprises:
executing the executable code on the electronic device responsive to authenticating the code authentication certificate and determining that a device identifier in the code authentication certificate matches the unique device identifier.

13. The method of claim 11, wherein determining that the lab certificate is valid further comprises:
using a public lab certificate key associated with the lab certificate to verify a signature of the lab certificate, and verifying that a device identifier in the lab certificate matches the unique device identifier.

14. The method of claim 11, wherein authenticating the lab certificate further comprises using a public lab certificate key associated with the lab certificate to verify a signature of the lab certificate, and verifying that a device identifier in the lab certificate matches the unique device identifier.

15. The method of claim 11, further comprising at least one of:
installing the lab certificate on the electronic device independent of other software operations on the electronic device; and
removing the lab certificate from the electronic device independent of other software operations on the electronic device.

16. The method of claim 11, further comprising using the lab certificate as at least one of a development certificate and a debugging certificate to enable at least one of a development activity and a debugging activity executed on the electronic device, wherein the at least one development certificate and debugging certificate includes a device identifier.

17. The method of claim 11, wherein authenticating the lab certificate comprises determining based on an expiration value of the lab certificate that the lab certificate has not expired.

18. The method of claim 17, wherein the expiration value is one of a time stamp and a first counter value and wherein determining that the lab certificate has not expired comprises one of:
   determining, by the processor, a time value and comparing the time stamp to the time value; and
   determining, by the processor, a second counter value and comparing the first counter value to the second counter value.

19. A method for an electronic device to execute code, the method comprising:
   maintaining, by the electronic device, a unique device identifier;
   identifying, by the electronic device, a key that can be utilized to verify a code authentication certificate associated with the code;
   determining, by the electronic device, that the code authentication certificate is valid by verifying a signature of the code authentication certificate using the key;
   determining whether the key is a public release key or a public developer key rooted by a trust anchor of the electronic device;
   in response to determining that the key is a release key and to determining that the code authentication certificate is valid, executing, by the electronic device, the code;
   in response to determining that the key is a public developer key, determining whether a valid lab certificate is present on the electronic device;
   in response to determining that the key is a public developer key, determining that the code authentication certificate is valid and that a valid lab certificate is present on the electronic device, executing, by the electronic device, the code.

20. The method of claim 19, further comprising:
   in response to determining that the key is a public developer key and that a valid lab certificate is not present on the electronic device, determining whether the code authentication certificate comprises a device identifier and whether the device identifier matches the unique device identifier; and
   in response to determining that the key is a public developer key, determining that the code authentication certificate is valid, that the code authentication certificate comprises a device identifier, and that the device identifier matches the unique device identifier, executing, by the electronic device, the code.

21. The method of claim 19, wherein determining that the lab certificate is valid further comprises using a public lab certificate key associated with the lab certificate to verify a signature of the lab certificate, and verifying that a device identifier in the lab certificate matches the unique device identifier.

* * * * *